(12) United States Patent
Yano et al.

(10) Patent No.: US 12,305,700 B2
(45) Date of Patent: May 20, 2025

(54) THRUST BEARING DEVICE AND TURBOCHARGER

(71) Applicant: MITSUBISHI HEAVY INDUSTRIES ENGINE & TURBOCHARGER, LTD., Sagamihara (JP)

(72) Inventors: Seigi Yano, Tokyo (JP); Takaya Futae, Tokyo (JP); Shuichi Isayama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 15 days.

(21) Appl. No.: 18/271,616

(22) PCT Filed: Feb. 3, 2022

(86) PCT No.: PCT/JP2022/004154
§ 371 (c)(1),
(2) Date: Jul. 10, 2023

(87) PCT Pub. No.: WO2022/168897
PCT Pub. Date: Aug. 11, 2022

(65) Prior Publication Data
US 2024/0052880 A1 Feb. 15, 2024

(30) Foreign Application Priority Data
Feb. 5, 2021 (JP) .................. 2021-017245

(51) Int. Cl.
*F16C 17/04* (2006.01)
*F16C 17/06* (2006.01)

(52) U.S. Cl.
CPC .......... *F16C 17/06* (2013.01); *F16C 2360/24* (2013.01)

(58) Field of Classification Search
CPC ................ F16C 17/047; F16C 2360/24; F16C 33/1075; F16C 17/107
See application file for complete search history.

(56) References Cited

U.S. PATENT DOCUMENTS

| | | | |
|---|---|---|---|
| 4,157,834 | A | 6/1979 | Burdette |
| 6,132,094 | A | 10/2000 | Cornelison et al. |

(Continued)

FOREIGN PATENT DOCUMENTS

| | | |
|---|---|---|
| JP | 61-202647 U | 12/1986 |
| JP | 2003-222123 A | 8/2003 |

(Continued)

OTHER PUBLICATIONS

International Preliminary Report on Patentability and Written Opinion of the International Searching Authority for International Application No. PCT/JP2022/004154, dated Aug. 17, 2023, with an English translation.

(Continued)

*Primary Examiner* — James Pilkington
*Assistant Examiner* — Aimee Tran Nguyen
(74) *Attorney, Agent, or Firm* — BIRCH, STEWART, KOLASCH & BIRCH, LLP

(57) ABSTRACT

A thrust bearing device includes: a thrust collar having a drive shaft, the thrust collar including a flange portion extending radially outward of the drive shaft; and a thrust member penetrated by the thrust collar and including a pad portion. The pad portion includes: a plurality of land portions which are parallel to a plane orthogonal an axis of the drive shaft and are disposed at intervals in a circumferential direction of the drive shaft; and tapered portions each of which is disposed between adjacent land portions among the plurality of land portions, joined via a step to a boundary of one land portion in the circumferential direction of the drive (Continued)

shaft, and joined continuously to a boundary of another land portion. Each of the land portions has a circumferential groove which is longer in the circumferential direction than in a radial direction of the drive shaft.

8 Claims, 11 Drawing Sheets

(56) References Cited

U.S. PATENT DOCUMENTS

| | | | |
|---|---|---|---|
| 10,113,587 B1 * | 10/2018 | Nicodemus | ............ F16C 17/047 |
| 2008/0121200 A1 | 5/2008 | Kato et al. | |
| 2016/0348721 A1 * | 12/2016 | Futae | .................... F01D 25/168 |

FOREIGN PATENT DOCUMENTS

| | | |
|---|---|---|
| JP | 2003-232339 A | 8/2003 |
| JP | 2004-60836 A | 2/2004 |
| JP | 2005-155894 A | 6/2005 |
| JP | 2006-316677 A | 11/2006 |
| JP | 2015-224676 A | 12/2015 |
| WO | WO 2015/128977 A1 | 9/2015 |

OTHER PUBLICATIONS

International Search Report and Written Opinion of the International Searching Authority for International Application No. PCT/JP2022/004154, dated Apr. 12, 2022.

German Office Action for German Application No. 112022000286.7, dated Jan. 15, 2025, with an English translation.

* cited by examiner

THRUST BEARING DEVICE AND TURBOCHARGER

TECHNICAL FIELD

The present disclosure relates to a thrust bearing device and a turbocharger.

This application claims the priority of Japanese Patent Application No. 2021-017245 filed on Feb. 5, 2021, the content of which is incorporated herein by reference.

BACKGROUND

A turbocharger for an automobile includes a turbine and a compressor, and a turbine blade of the turbine and an impeller of the compressor are coupled to each other via a drive shaft. The drive shaft is rotatably supported by a thrust bearing device for supporting an axial load.

For example, a thrust bearing device disclosed in Patent Document 1 is a tapered land thrust bearing device that includes a thrust color fitted onto a drive shaft, and a thrust member penetrated by the drive shaft and disposed facing the thrust color. The thrust member is provided with: a plurality of land portions each of which is parallel to a plane orthogonal to an axis of the drive shaft, the land portions being disposed at intervals in a circumferential direction of a through hole; and tapered portions each of which is disposed between the plurality of land portions, joined via a step to a boundary of the land portion on one side in the circumferential direction of the through hole, and joined continuously to a boundary of the land portion on the other side in the circumferential direction of the through hole.

CITATION LIST

Patent Literature

Patent Document 1: WO2015/128977A

SUMMARY

Technical Problem

However, in the thrust bearing device disclosed in Patent Document 1, an oil film intervening between the thrust member and the thrust collar becomes thin and a load capacity of the thrust bearing device significantly decreases, if the thrust collar is inclined by a shaft vibration and the thrust member is brought into contact with the thrust collar.

The present disclosure has been made in view of the above-described problems, and an object of the present disclosure is to provide the thrust bearing device and a turbocharger which are capable of ensuring the load capacity of the thrust bearing device even if the thrust collar is inclined by the shaft vibration and the thrust collar is brought into contact with the thrust member.

Solution to Problem

In order to achieve the above object, a thrust bearing device according to the present disclosure, includes: a thrust collar fitted with a drive shaft, the thrust collar including a flange portion extending radially outward of the drive shaft; and a thrust member penetrated by the thrust collar and including a pad portion in a region facing the flange portion. The pad portion includes: a plurality of land portions which are parallel to a plane orthogonal an axis of the drive shaft and are disposed at intervals in a circumferential direction of the drive shaft; and tapered portions each of which is disposed between adjacent land portions among the plurality of land portions, joined via a step to a boundary of one land portion in the circumferential direction of the drive shaft, and joined continuously to a boundary of another land portion. Each of the land portions has a circumferential groove which is longer in the circumferential direction than in a radial direction of the drive shaft.

Advantageous Effects

According to a thrust bearing device of the present disclosure, even if a thrust collar is inclined by a shaft vibration, the thrust collar is brought into contact with a thrust member (pad portion), and lubricant oil is heated between the thrust collar and the thrust member, it is possible to suppress that the heated lubricant oil flows from an outer peripheral side to an inner peripheral side of a land portion. Whereby, since thinning of an oil film on the inner peripheral side of the land portion is suppressed, a load capacity of the thrust bearing device does not significantly decrease and the load capacity of the thrust bearing device can be ensured.

DETAILED DESCRIPTION

Figure 1:
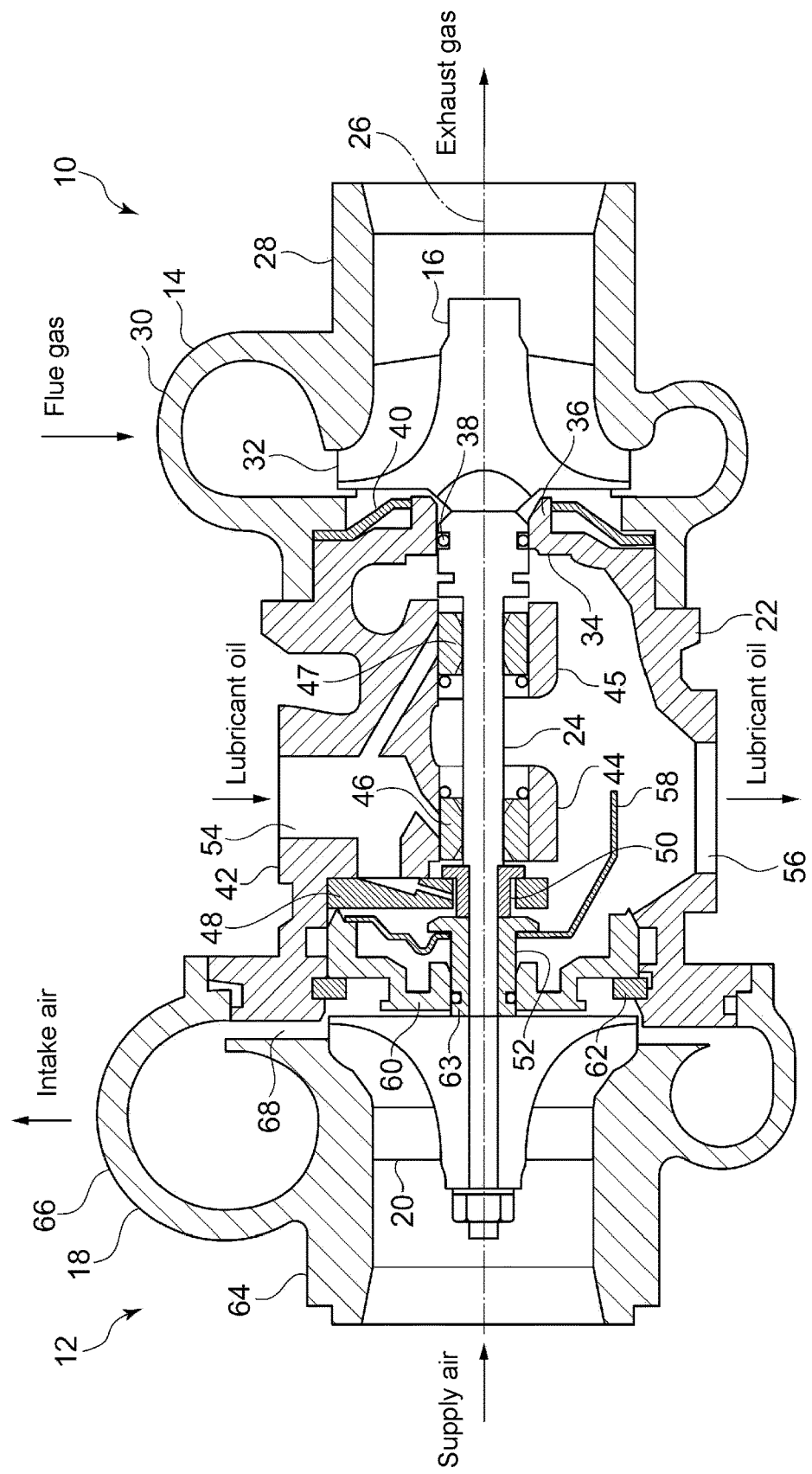
FIG. 1 is a vertical cross-sectional view schematically showing a main part configuration of a turbocharger according to an embodiment.

Hereinafter, a thrust bearing device and a turbocharger provided with the thrust bearing device according to an embodiment of the present disclosure will be described with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention.

FIG. 1 is a vertical cross-sectional view schematically showing a turbocharger according to an embodiment. The turbocharger is mounted on, for example, an automobile engine.

The turbocharger includes a turbine 10 and a compressor 12 of centrifugal type. The turbine 10 includes a turbine housing 14 and a turbine blade (turbine impeller) 16 accommodated rotatably in the turbine housing 14, and the compressor 12 includes a compressor housing 18 and an impeller (compressor impeller) 20 accommodated rotatably in the compressor housing 18.

The turbine housing 14 and the compressor housing 18 are fixed to a bearing housing 22 via a non-depicted fastening member, and the turbine blade 16 of the turbine 10 and the impeller 20 of the compressor 12 are coupled to each other by a drive shaft (turbine rotor) 24 extending in the bearing housing 22. Thus, the turbine blade 16, the impeller 20, and the drive shaft 24 are disposed on the same axis 26. The turbine blade 16 of the turbine 10 is rotated by an exhaust gas discharged from the automobile engine, for example, whereby the impeller 20 of the compressor 12 is rotated via the drive shaft 24. The rotation of the impeller 20 of the compressor 12 compresses supply air to be supplied to the automobile engine.

For example, the turbine housing 14 includes a cylindrical section (shroud section) 28 for accommodating the turbine blade 16, and a scroll section 30 for surrounding a part of the cylindrical section 28 on a side of the bearing housing 22. The scroll section 30 has a non-depicted inlet of the exhaust gas, and is in communication with the cylindrical section 28 via a throat portion 32. An opening of the cylindrical section 28 on an opposite side from the bearing housing 22 forms an outlet of the exhaust gas.

To an opening of the turbine housing 14 on the side of the bearing housing 22, an end wall 34 of the bearing housing 22 is fitted and engaged. A seal portion 36 of a cylindrical shape is integrally and co-axially disposed on the end wall 34, and the seal portion 36 forms a seal hole penetrating through the center of the end wall 34. An end portion of the drive shaft 24 on a side of the turbine blade 16 is disposed in the seal portion 36, and a seal ring 38 is disposed in a gap between the drive shaft 24 and the seal portion 36.

A back plate 40 of an annular shape is disposed in an annular recess between the end wall 34 and a back surface of the turbine blade 16. An outer circumferential portion of the back plate 40 is sandwiched by the turbine housing 14 and the bearing housing 22, and an inner circumferential edge of the back plate 40 surrounds the seal portion 36.

A pair of bearing sections 44, 45 is disposed integrally with a peripheral wall 42 inside the bearing housing 22, and a bearing hole is formed in each of the pair of bearing sections 44, 45. For example, floating bushes 46, 47 are disposed in each bearing hole of the pair of bearing sections 44, 45 to function as radial bearings, and the center part of the drive shaft 24 is disposed in the bearing hole of the bearing section 44 in a state of being inserted through the floating bushes 46, 47.

A thrust member 48 of a plate shape orthogonal to the axis 26 is fixed to an end surface of the bearing section 44 on the side of the compressor 12, and the drive shaft 24 is inserted through a through hole of the thrust member 48. A thrust collar 50 and a thrust sleeve 52 are fitted onto the drive shaft 24, and the thrust member 48, the thrust collar 50, and the thrust sleeve 52 form the thrust bearing device.

Herein, an oil feed port 54 and an oil drain port 56 are disposed in the peripheral wall 42 of the bearing housing 22, and an oil feed passage for feeding lubricant oil to bearing gaps of the radial bearing and the thrust bearing is formed through the bearing section 44 and the thrust member 48. Meanwhile, an oil deflector 58 is disposed so as to cover a face of the thrust member 48 on the side of the compressor 12 in order to prevent the lubricant oil from scattering toward the compressor 12.

A lid member 60 with a seal hole in the center is fitted onto an opening of the bearing housing 22 on the side of the compressor 12, and the lid member 60 is fixed to the bearing housing 22 by a fixing ring 62. The thrust sleeve 52 is inserted through the seal hole of the lid member 60, and a seal ring 63 is disposed in a gap between the thrust sleeve 52 and the seal hole.

For example, the compressor housing 18 includes a cylindrical (shroud) section 64 for accommodating the impeller 20, and a scroll section 66 for surrounding a part of the cylindrical section 64 on the side of the bearing housing 22. The scroll section 66 has a non-depicted outlet of supply air, and is in communication with the cylindrical section 64 via a diffuser section 68. An opening of the cylindrical section 64 on the opposite side from the bearing housing 22 forms an inlet of intake air.

Figure 2:
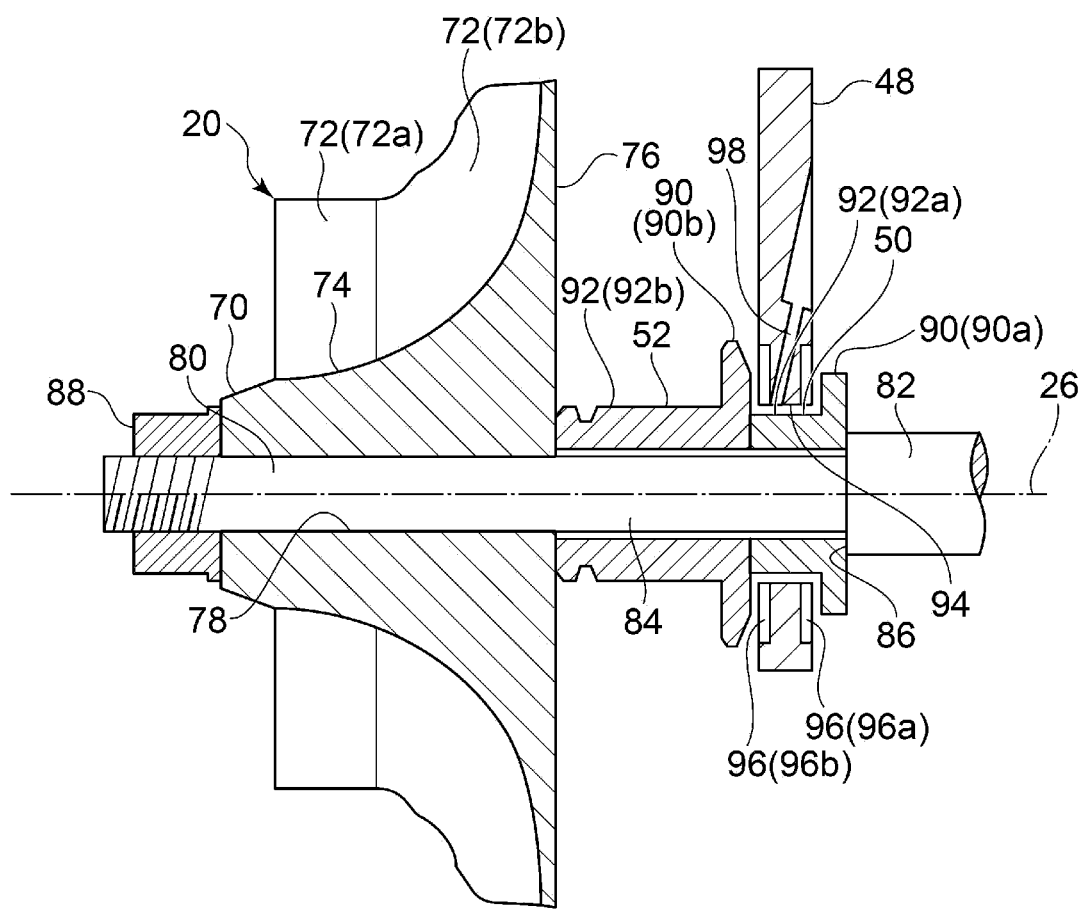
FIG. 2 is a view for describing an attachment structure of a thrust bearing with respect to a drive shaft.

FIG. 2 is a view for describing an attachment structure of the thrust bearing device with respect to the drive shaft 24.

The impeller 20 includes a hub 70 and a plurality of blades 72. The hub 70 has a shape which is rotationally symmetric with respect to the axis 26. One end side of the hub 70 is disposed on an inlet side of supply air, and the other end side of the hub 70 is disposed on the side of the diffuser section 68, in a direction along the axis 26. An outer peripheral surface 74 of the hub 70 has a trumpet shape that widens form the one end side toward the other end side, and the hub 70 has a back surface 76 that faces the lid member 60 on the other end side.

The hub 70 has an attachment hole 78 penetrating through the hub 70 along the axis 26, and the attachment hole 78 has openings at both ends of the hub 70. A plurality of blades 72 are disposed integrally to the outer peripheral surface 74 of the hub 70, and is arranged at a predetermined interval in the circumferential direction of the hub 70. For example, the plurality of blades 72 include full blades 72a and splitter blades 72b which are shorter than the full blades 72a in the direction along the axis 26, and the full blades 72a and the splitter blades 72b are disposed alternately in the circumferential direction.

The drive shaft 24 includes a shaft section 80, a large-diameter section 82, and a middle section 84, which are formed integrally with one another. The shaft section 80 extends inside the attachment hole 78 of the impeller 20, and the large-diameter section 82 is separated from the impeller 20. The middle section 84 is disposed between the shaft section 80 and the large-diameter section 82. The middle section 84 has a smaller diameter than the large-diameter section 82, and a stepped portion 86 is formed on the boundary between the middle section 84 and the large-diameter section 82.

A female screw is formed on a distal end side of the shaft section 80 disposed on one end side of the impeller 20, and a nut as a fastening member 88 is screwed onto the female screw. The fastening member 88 contacts on the one end side of the impeller 20, and applies an axial force to the impeller 20 toward the stepped portion 86 in the direction along the axis 26.

The thrust collar 50 and the thrust sleeve 52 are fitted onto the middle section 84 of the drive shaft 24 in series, and have flange portions 90 (90a, 90b), respectively.

Further, the thrust collar 50 and the thrust sleeve 52 include sleeve portions 92 (92a, 92b) integrally formed with the flange portions 90 (90a, 90b), respectively, and the sleeve portions 92 (92a, 92b) are fitted onto the middle section 84. The sleeve portion 92a is disposed between the flange portion 90a and the flange portion 90b, and the sleeve portion 92b is disposed between the flange portion 90b and the impeller 20.

The thrust collar 50 and the thrust sleeve 52 are held between the stepped portion 86 and a back surface 76 of the impeller 20 by an axial force of the fastening member 88, and configured to rotate with the drive shaft 24.

The thrust member 48 has a through hole 94 penetrated by the middle section 84, and the sleeve portion 92a is disposed between an inner peripheral surface of the through hole 94 and an outer peripheral surface of the middle section 84. The thrust member 48 has a pad portion 96 which is disposed around the through hole 94 and which is in slide contact with the flange portions 90a, 90b in the direction along the axis 26. In the embodiment, the thrust member 48 includes the pad portions 96 (96a, 96b) on both sides in the direction along the axis 26.

Further, the thrust member 48 has an oil-feed hole 98 forming an oil-feed passage, and an outlet of the oil-feed hole 98 opens to the inner peripheral surface of the through hole 94. Lubricant oil which flows out of the outlet of the oil-feed hole 98 is supplied to a clearance between the pad portions 96 (96a, 96b) and the flange portions 90 (90a, 90b) through a gap between the outer peripheral surface of the sleeve portion 92a and the inner peripheral surface of the through hole 94.

Figure 3:
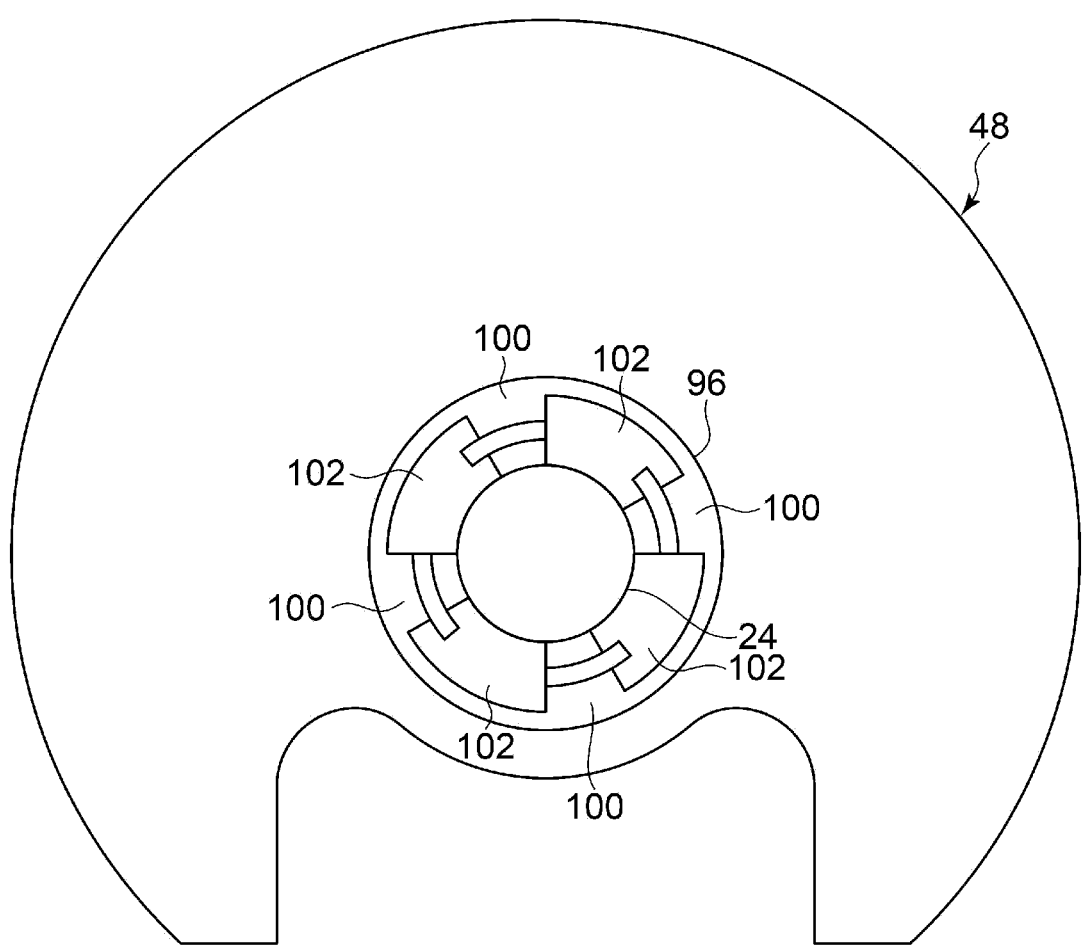
FIG. 3 is a side view schematically showing a thrust member.
Figure 4:
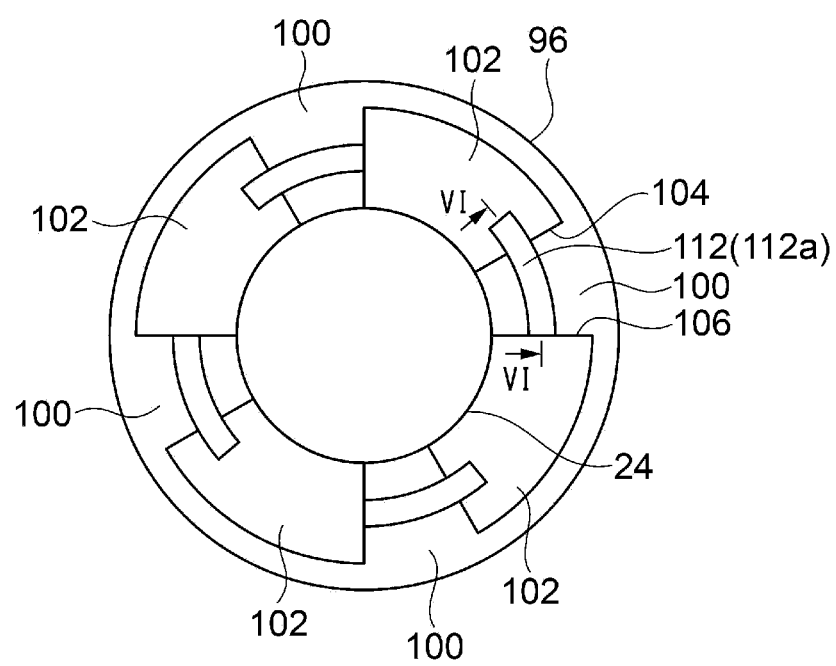
FIG. 4 is an enlarged view showing an example of a pad shown in FIG. 3.
Figure 5:
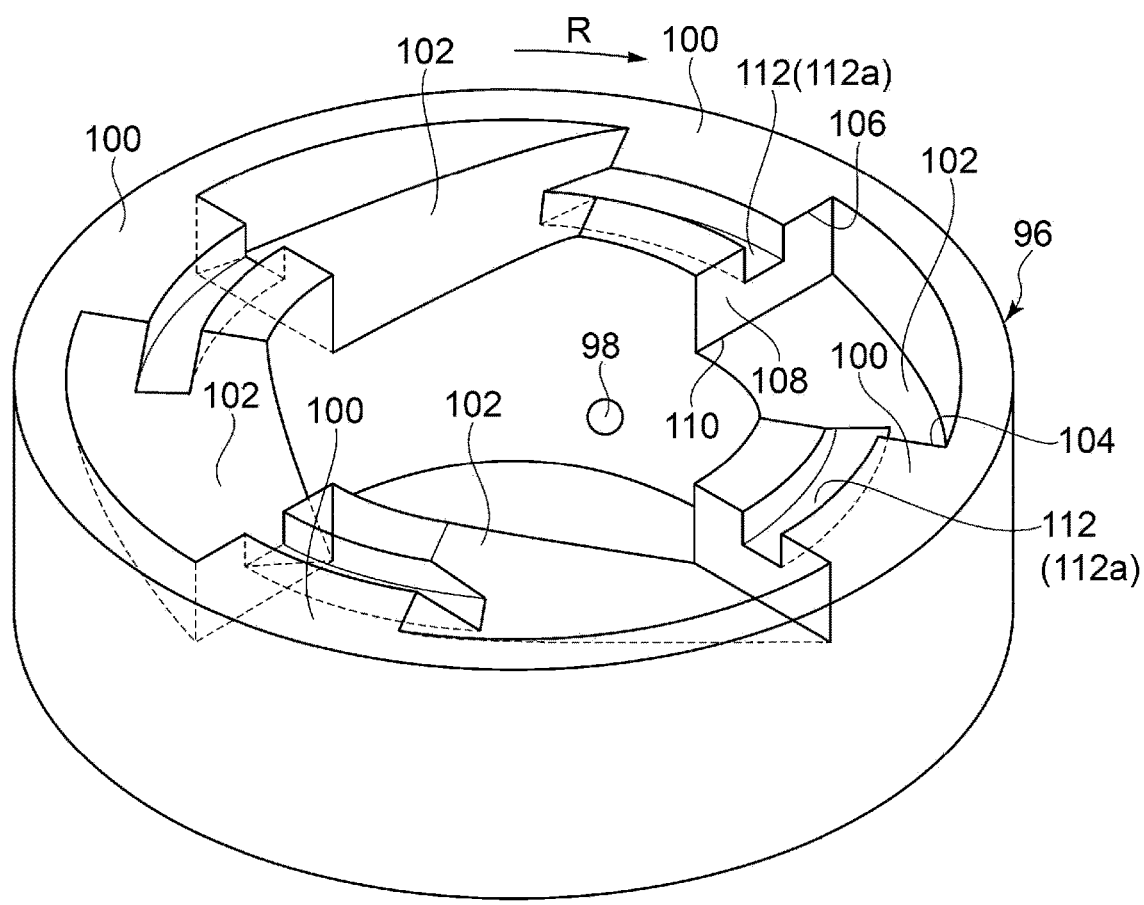
FIG. 5 is an enlarged perspective view of the pad shown in FIG. 4.
Figure 6:
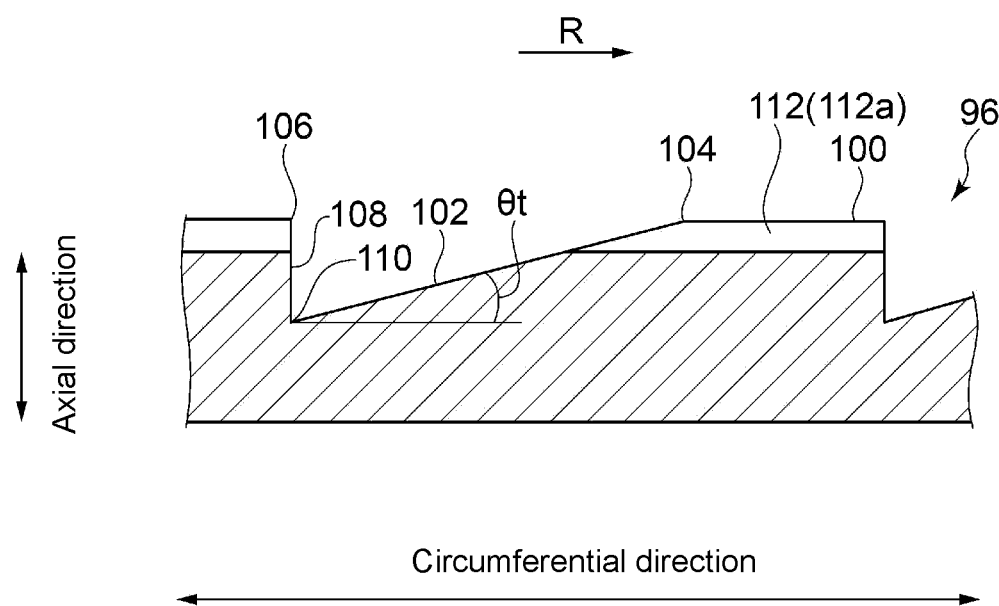
FIG. 6 is an exploded view showing a partial cross section of the pad taken along line VI-VI shown in FIG. 4.
Figure 7:
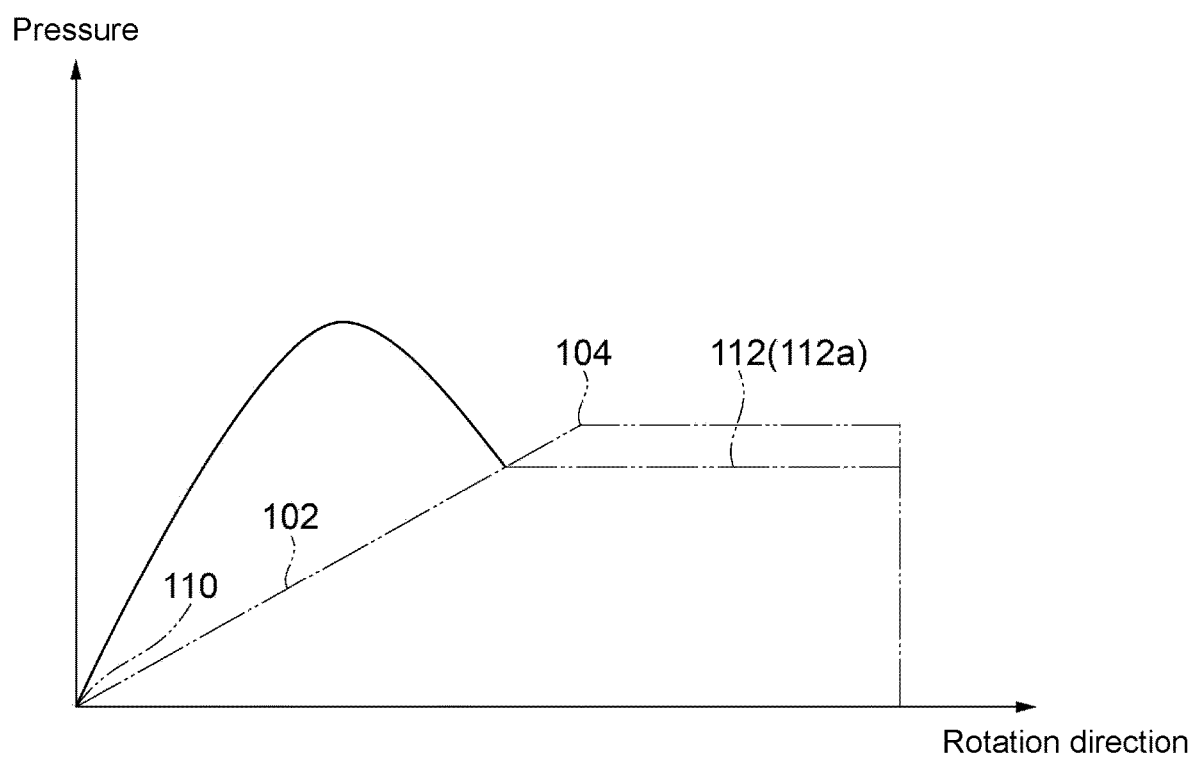
FIG. 7 is a graph showing a pressure distribution of lubricant oil in a tapered portion shown in FIG. 6.
Figure 8:
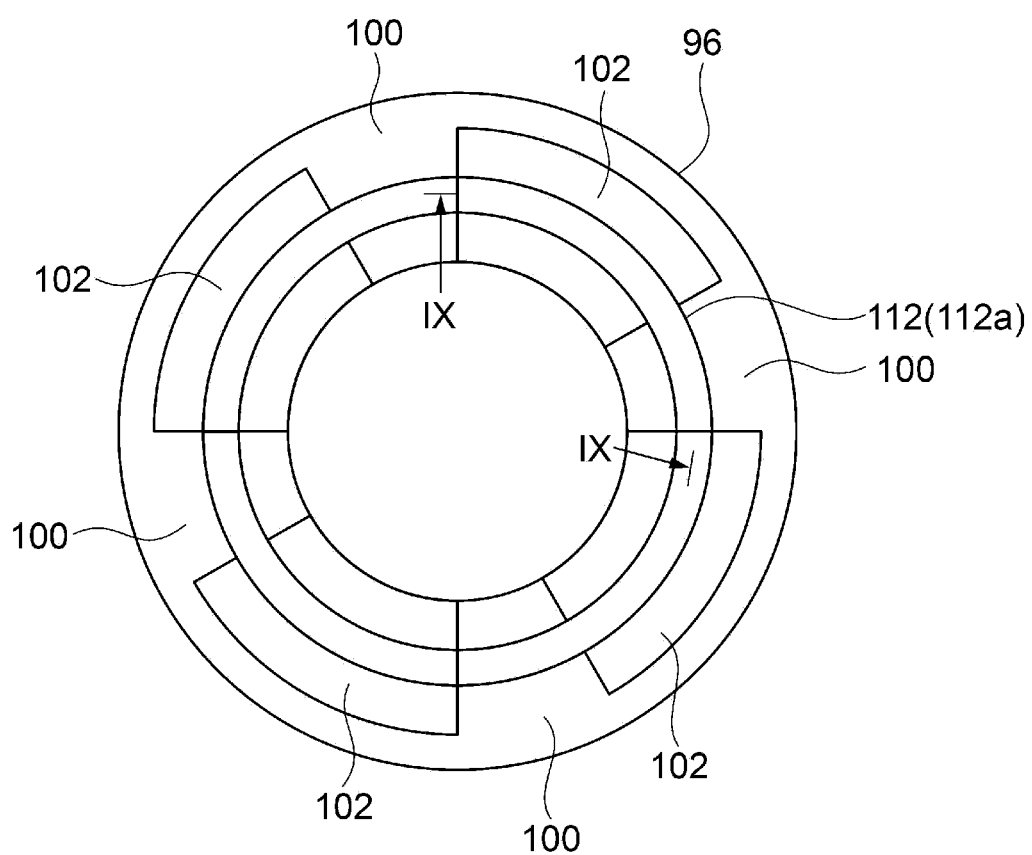
FIG. 8 is an enlarged view showing another example of the pad shown in FIG. 3.
Figure 9:
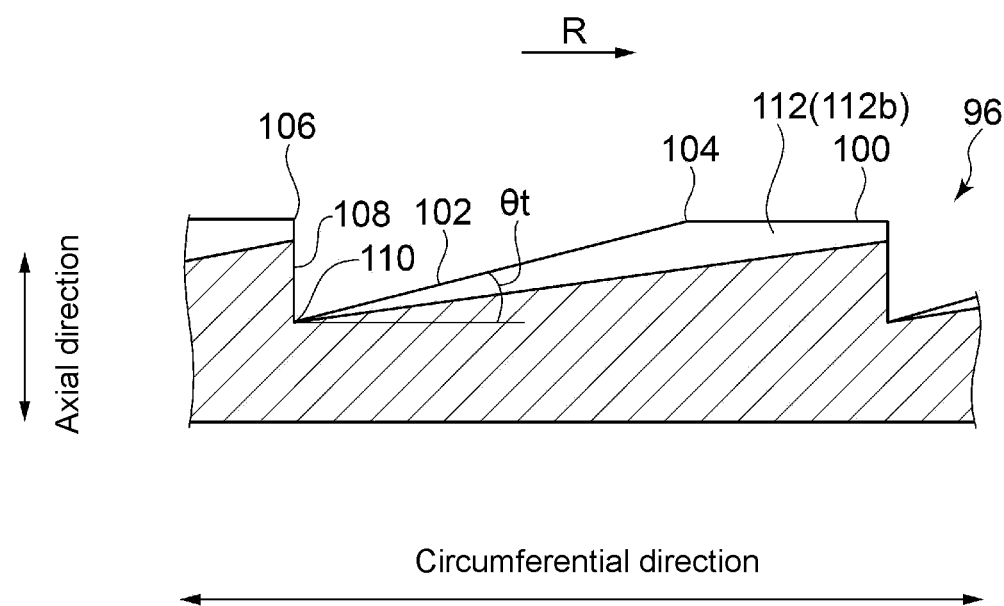
FIG. 9 is an exploded view showing an example of a partial cross section of the pad taken along line IX-IX shown in FIG. 8.
Figure 10:
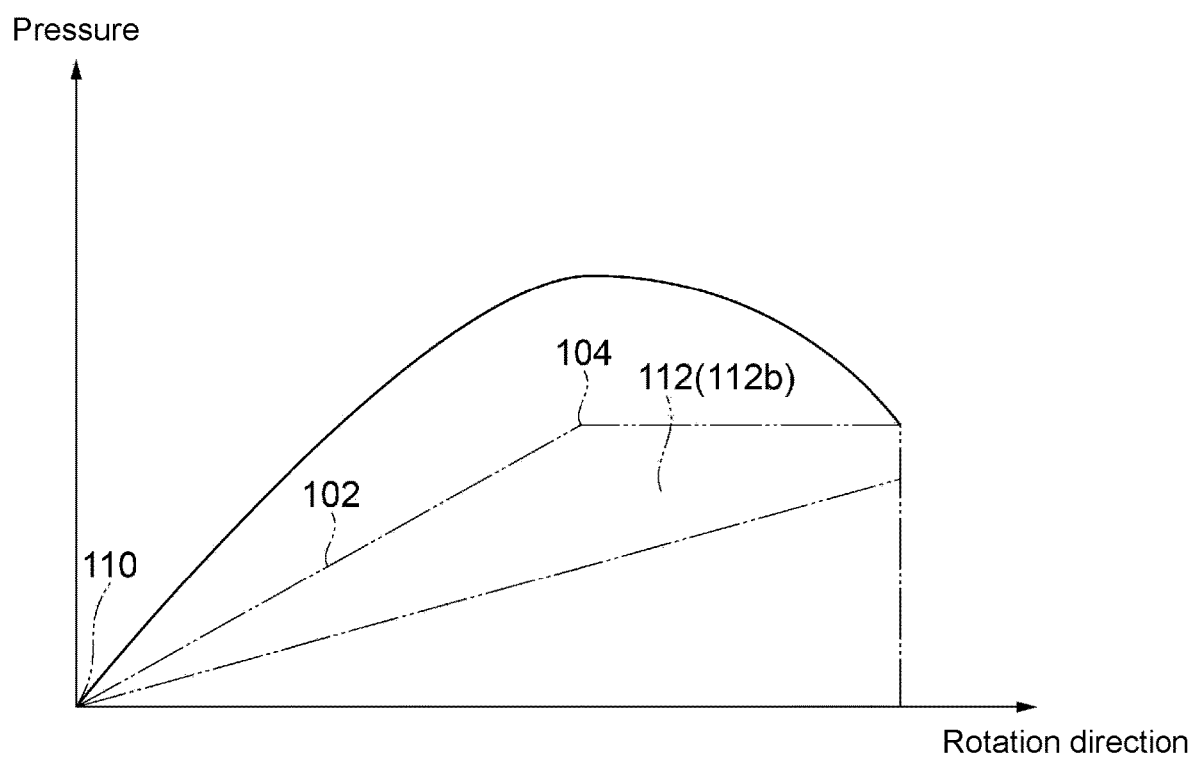
FIG. 10 is a graph showing a pressure distribution of the lubricant oil in a circumferential groove shown in FIG. 8.

FIG. 3 is a side view schematically showing the thrust member 48. FIG. 4 is an enlarged view showing an example of the pad portion 96 shown in FIG. 3. FIG. 5 is an enlarged perspective view of the pad portion 96 shown in FIG. 4. FIG. 6 is an exploded view showing a partial cross section taken along line VI-VI shown in FIG. 4. FIG. 7 is a graph showing a pressure distribution of lubricant oil in a tapered portion 102 shown in FIG. 6. Further, FIG. 8 is an enlarged view showing another example of the pad portion 96 shown in FIG. 3. FIG. 9 is an exploded view showing a partial cross section taken along line IX-IX shown in FIG. 8. FIG. 10 is a graph showing a pressure distribution of the lubricant oil in a circumferential groove 112 shown in FIG. 9.

As shown in FIG. 3, the pad portion 96 disposed in the thrust member 48 includes a plurality of land portions 100 and a plurality of tapered portions 102 disposed alternately in the circumferential direction of the drive shaft 24.

The plurality of land portions 100 are parallel to a plane orthogonal the axis of the drive shaft 24 and are disposed at intervals in the circumferential direction of the drive shaft 24. As shown in FIG. 4, each land portion 100 has boundaries 104, 106 on both sides in the circumferential direction of the drive shaft 24, and the boundaries 104, 106 extend along the radial direction of the drive shaft 24. Thus, each land portion 100 has a contour of a sector shape, and a sliding surface of each land portion 100 is disposed flush with the plane orthogonal to the axis.

As shown in FIG. 5, the plurality of tapered portions 102 are each disposed between adjacent two of the plurality of land portions 100 in the circumferential direction of the drive shaft 24. Each tapered portion 102 is joined via a step 108 to the boundary 106 of the land portion 100 on one side in the circumferential direction of the drive shaft 24, and is joined continuously to the boundary 104 of the land portion 100 on the other side in the circumferential direction of the drive shaft 24. Accordingly, a boundary 110 on one side of the tapered portion 102 is away from the land portion 100 in the axial direction of the drive shaft 24. Each tapered portion 102 extends around the axis of the drive shaft 24 in a spiral shape, and is inclined from a plane orthogonal to the axis of the drive shaft 24 at an inclination angle θt (see FIG. 6).

Each of the plurality of land portions 100 has a circumferential groove 112 which is longer in the circumferential direction than in the radial direction of the drive shaft 24.

With this configuration, since the land portion 100 has the circumferential groove 112 which is longer in the circumferential direction than in the radial direction of the drive shaft 24, the land portion 100 is divided into an inner peripheral side and an outer peripheral side in the radial direction of the drive shaft 24. Consequently, even if the thrust collar 50 is inclined by a shaft vibration, the thrust collar 50 is brought into contact with the thrust member 48, and the lubricant oil is overheated between the thrust collar 50 and the thrust member 48, it is possible to suppress that the heated lubricant oil flows from the outer peripheral side to the inner peripheral side of the land portion 100. Whereby, since thinning of an oil film on the inner peripheral side of the land portion 100 is suppressed, a load capacity of the thrust bearing device does not significantly decrease and the load capacity of the thrust bearing device can be ensured.

The circumferential groove 112 communicates with one tapered portion 102 and the another tapered portion 102 adjacent to the land portion 100. Thus, the circumferential groove 112 communicating with the one tapered portion 102 and the another tapered portion 102 adjacent to the land portion 100 is disposed over a part of the tapered portion 102 joined continuously to the land portion 100.

With this configuration, since the circumferential groove 112 communicates with the one tapered portion 102 and the another tapered portion 102 adjacent to land portion 100, the lubricant oil having flowed into the one tapered portion 102 flows into the another tapered portion 102 through the circumferential groove 112. Consequently, the overheating of the lubricant oil on the inner peripheral side of the land portion 100 is suppressed, suppressing the thinning of the oil film on the inner peripheral side of the land portion 100. Whereby, the load capacity of the thrust bearing device does not significantly decrease and the load capacity of the thrust bearing device can be ensured.

The circumferential groove 112 is disposed in the center part of the land portion 100 in the radial direction of the drive shaft 24.

With this configuration, the sliding surface is secured on the inner peripheral side of the land portion 100, and thinning of the oil film on the sliding surface is suppressed. Whereby, the load capacity on the inner peripheral side of the land portion 100 does not significantly decrease and the load capacity of the thrust bearing device can be ensured.

As shown in FIG. 6, the above-described circumferential groove 112 is, for example, a groove 112a having a uniform depth in the land portion 100. Thus, the groove 112a having the uniform depth is disposed over a part of the tapered portion 102 joined continuously to the land portion 100.

With this configuration, since the circumferential groove 112 is the groove 112a having the uniform depth in the land portion 100, the circumferential groove 112 is easily machined.

If the circumferential groove 112 is the groove 112a having the uniform depth in the land portion 100, as shown in FIG. 7, a pressure of the lubricant oil is distributed in the tapered portion 102 and converges at an inlet of the circumferential groove 112.

As shown in FIGS. 8 and 9, the above-described circumferential groove 112 is, for example, a groove 112b which is disposed from the land portion 100 to the tapered portion 102 and gradually becomes shallower in the tapered portion 102 from the boundary 104 continuously joined to the land portion 100 toward the boundary 106 joined via the step 108 to the land portion 100. The circumferential groove 112 is not limited to being disposed over an entire area of the tapered portion 102 as long as the circumferential groove 112 is disposed from the land portion 100 to the tapered portion 102, and the circumferential groove 112 may be disposed from the land portion 100 to the middle of the tapered portion 102.

If the circumferential groove 112 is the groove 112b which is disposed from the land portion 100 to the tapered portion 102 and gradually becomes shallower in the tapered portion 102 from the boundary 104 continuously joined to the land portion 100 toward the boundary joined via the step 108 to the land portion 100, as shown in FIG. 10, the pressure of the lubricant oil is distributed even in the circumferential groove 112, and it is possible to suppress the decrease in load capacity of the thrust bearing device due to the provision of the circumferential groove 112.

Figure 11:
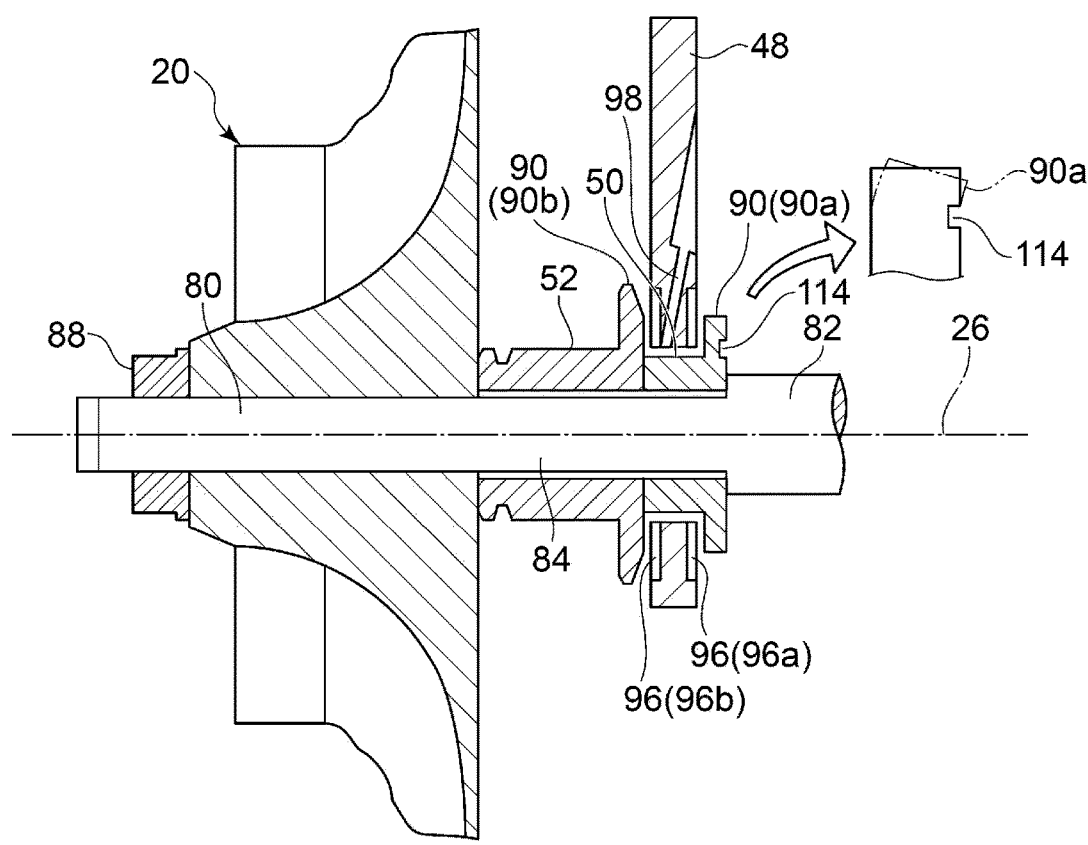
FIG. 11 is a view for describing the attachment structure of the thrust bearing with respect to the drive shaft, and is a view showing an example of adopting the thrust collar having a slit in the thrust collar.

FIG. 11 is a view for describing the attachment structure of the thrust bearing with respect to the drive shaft, and is a view showing an example of adopting the thrust collar 50 having a slit 114 in the flange portion 90a of the thrust collar 50.

As shown in FIG. 11, the flange portion 90a of the thrust collar 50 has the slit 114, which extends along the circumferential direction of the drive shaft 24, on an opposite side from a surface facing the pad portion 96.

With this configuration, since the flange portion 90a of the thrust collar 50 has the slit 114, which extends along the circumferential direction of the drive shaft 24, on the opposite side from the surface facing the pad portion 96, the flange portion 90a is elastically deformed if the thrust collar 50 is inclined by the shaft vibration, thereby securing a clearance between the thrust collar 50 and the thrust member 48. Whereby, since thinning of the oil film between the thrust collar 50 and the thrust member 48 is suppressed, the load capacity of the thrust bearing device does not significantly decrease and the load capacity of the thrust bearing device can be ensured.

The above-described slit 114 is disposed on an outer side relative to the center of the flange portion 90a in the radial direction of the drive shaft 24, for example.

With this configuration, since the slit 114 is disposed on the outer side relative to the center of the flange portion 90a in the radial direction of the drive shaft 24, the outer side (outer peripheral side) relative to the center of the flange portion 90a is elastically deformed in the radial direction of the drive shaft 24 if the thrust collar 50 is inclined by the shaft vibration. Whereby, it is possible to secure the rigidity of an inner peripheral side of the flange portion 90a, in the radial direction of the drive shaft 24.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

A thrust bearing device according to an aspect [1], includes: a thrust collar (50) fitted with a drive shaft (24), the thrust collar including a flange portion (90a) extending radially outward of the drive shaft (24); and a thrust member (48) penetrated by the thrust collar (50) and including a pad portion (96) in a region facing the flange portion (90a). The pad portion (96) includes: a plurality of land portions (100) which are parallel to a plane orthogonal an axis of the drive shaft (24) and are disposed at intervals in a circumferential direction of the drive shaft (24); and tapered portions (102) each of which is disposed between adjacent land portions (100) among the plurality of land portions (100), joined via a step (108) to a boundary (106) of one land portion (100) in the circumferential direction of the drive shaft (24), and joined continuously to a boundary (104) of another land portion (100). Each of the land portions (100) has a circumferential groove (112 (112a, 112b)) which is longer in the circumferential direction than in a radial direction of the drive shaft (24).

With this configuration, since the land portion (100) has the circumferential groove (112 (112a, 112b)) which is longer in the circumferential direction than in the radial direction of the drive shaft (24), the land portion (100) is divided into an inner peripheral side and an outer peripheral side in the radial direction of the drive shaft (24). Consequently, even if the thrust collar (50) is inclined by a shaft vibration, the thrust collar (50) is brought into contact with the thrust member (48), and the lubricant oil is heated between the thrust collar (50) and the thrust member (48), it is possible to suppress that the heated lubricant oil flows from the outer peripheral side to the inner peripheral side of the land portion (100). Whereby, since thinning of an oil film on the inner peripheral side of the land portion (100) is suppressed, a load capacity of the thrust bearing device does not significantly decrease and the load capacity of the thrust bearing device can be ensured.

[2] A thrust bearing device according to another aspect is the thrust bearing device as defined in [1], wherein the circumferential groove (112 (112a, 112b)) communicates with one tapered portion (102) and another tapered portion (102) adjacent to the land portion (100).

With this configuration, since the circumferential groove (112 (112a, 112b)) communicates with the one tapered portion (102) and the another tapered portion (102) adjacent to land portion (100), the lubricant oil having flowed into the one tapered portion (102) flows into the another tapered portion (102) through the circumferential groove (112 (112a, 112b)). Consequently, the heating of the lubricant oil on the inner peripheral side of the land portion (100) is suppressed, suppressing the thinning of the oil film on the inner peripheral side of the land portion (100). Whereby, the load capacity of the thrust bearing device does not significantly decrease and the load capacity of the thrust bearing device can be ensured.

[3] A thrust bearing device according to another aspect is the thrust bearing device as defined in [1] or [2], wherein the circumferential groove (112 (112a, 112b)) is disposed in a center part of the land portion (100) in the radial direction of the drive shaft (24).

With this configuration, since the circumferential groove (112 (112a, 112b)) is disposed in the center part of the land portion (100) in the radial direction of the drive shaft (24), the sliding surface is secured on the inner peripheral side of the land portion (100), and thinning of the oil film on the sliding surface is suppressed. Whereby, the load capacity on the inner peripheral side of the land portion (100) does not significantly decrease and the load capacity of the thrust bearing device can be ensured.

[4] A thrust bearing device according to another aspect is the thrust bearing device as defined in any one of [1] to [3], wherein the circumferential groove (112a) is a groove having a uniform depth in the land portion (100).

With this configuration, since the circumferential groove (112a) is the groove having the uniform depth in the land portion (100), the circumferential groove (112a) is easily machined.

[5] A thrust bearing device according to another aspect is the thrust bearing device as defined in any one of [1] to [3], wherein the circumferential groove (112b) is a groove which is disposed from the land portion (100) to the tapered portion (102) and gradually becomes shallower in the tapered portion (102) from the boundary (104) continuously joined to the land portion (100) toward the boundary (106) joined via the step (108) to the land portion (100). With this configuration, since the circumferential groove (112b) is the groove which gradually becomes shallower from the boundary (104) continuously joined to the land portion (100) toward the boundary (106) joined via the step (108) to the land portion (100), the pressure of the lubricant oil is distributed even in the circumferential groove (112b), and it is possible to suppress the decrease in load capacity of the thrust bearing device due to the provision of the circumferential groove (112).

[6] A thrust bearing device according to another aspect is the thrust bearing device as defined in any one of [1] to [5], wherein the flange portion (90a) has a slit (114) extending along the circumferential direction of the drive shaft (24), on an opposite side from a surface facing the pad portion (96).

With this configuration, since the flange portion (90a) has the slit (114), which extends along the circumferential direction of the drive shaft (24), on the opposite side from the surface facing the pad portion (96), the flange portion (90a) is elastically deformed if the thrust collar (50) is inclined by the shaft vibration, thereby securing a clearance between the thrust collar (50) and the thrust member (48). Whereby, since thinning of the oil film between the thrust collar (50) and the thrust member (48) is suppressed, the load capacity of the thrust bearing device does not significantly decrease and the load capacity of the thrust bearing device can be ensured.

[7] A thrust bearing device according to another aspect is the thrust bearing device as defined in [6], wherein the slit (114) is disposed on an outer side relative to a center of the flange portion (90a) in the radial direction of the drive shaft (24).

With this configuration, since the slit (114) is disposed on the outer side relative to the center of the flange portion (90a) in the radial direction of the drive shaft (24), the outer side (outer peripheral side) relative to the center of the flange portion (90a) is elastically deformed in the radial direction of the drive shaft (24) if the thrust collar (50) is inclined by the shaft vibration. Whereby, it is possible to secure the rigidity of an inner peripheral side of the flange portion (90a), in the radial direction of the drive shaft (24).

[8] A turbocharger according to an aspect [8], includes the thrust bearing device as defined in any one of the above [1] to [7].

With this configuration, since thinning of the oil film on the inner peripheral side of the land portion (100) is suppressed, the load capacity of the thrust bearing device does not significantly decrease and the load capacity of the thrust bearing device can be ensured.

REFERENCE SIGNS LIST

10 Turbine
12 Compressor
14 Turbine housing
16 Turbine blade
18 Compressor housing
20 Impeller
22 Bearing housing
24 Drive shaft
26 Axis
28 Cylindrical section
30 Scroll section
32 Throat portion
34 End wall
36 Seal portion
38 Seal ring
40 Back plate
42 Peripheral wall
44, 45 Bearing section
46, 47 Floating bush
48 Thrust member
50 Thrust collar
52 Thrust sleeve
54 Oil feed port
56 Oil drain port
58 Oil deflector
60 Lid member
62 Fixing ring
63 Seal ring
64 Cylindrical section
66 Scroll section
68 Diffuser section
70 Hub
72 Blade
72a Full blade
72b Splitter blade
74 Outer peripheral surface
76 Back surface
78 Attachment hole
80 Shaft section
82 Large-diameter section
84 Middle section
86 Stepped portion
88 Fastening member
90, 90a, 90b Flange portion
92, 92a, 92b Sleeve portion
94 Through hole
96 Pad portion
98 Oil-feed hole
100 Land portion
102 Tapered portion
104 Boundary
106 Boundary
108 Step
110 Boundary
112 Circumferential groove
114 Slit

The invention claimed is:
1. A thrust bearing device, comprising:
a thrust collar fitted with a drive shaft, the thrust collar including a flange portion extending radially outward of the drive shaft; and
a thrust member penetrated by the thrust collar and including a pad portion in a region facing the flange portion,
wherein the pad portion includes:
a plurality of land portions which are parallel to a plane orthogonal an axis of the drive shaft and are disposed at intervals in a circumferential direction of the drive shaft; and tapered portions each of which is disposed between adjacent land portions among the plurality of land portions, joined via a step to a boundary of one land portion in the circumferential direction of the drive shaft, and joined continuously to a boundary of another land portion, wherein each of the land portions has a circumferential groove which is longer in the circumferential direction than in a radial direction of the drive shaft, and wherein the circumferential groove communicates with one tapered portion and another tapered portion adjacent to the land portion.

2. The thrust bearing device according to claim 1,
wherein the circumferential groove is disposed in a center part of the land portion in the radial direction of the drive shaft.

3. The thrust bearing device according to claim 1,
wherein the circumferential groove is a groove having a uniform depth in the land portion.

4. The thrust bearing device according to claim 1,
wherein the circumferential groove is a groove which is disposed from the land portion to the tapered portion and gradually becomes shallower in the tapered portion from the boundary continuously joined to the land portion toward the boundary joined via the step to the land portion.

5. A turbocharger comprising the thrust bearing device according to claim 1.

6. A thrust bearing device, comprising:
a thrust collar fitted with a drive shaft, the thrust collar including a flange portion extending radially outward of the drive shaft; and
a thrust member penetrated by the thrust collar and including a pad portion in a region facing the flange portion, wherein the pad portion includes:
a plurality of land portions which are parallel to a plane orthogonal an axis of the drive shaft and are disposed at intervals in a circumferential direction of the drive shaft; and tapered portions each of which is disposed between adjacent land portions among the plurality of land portions, joined via a step to a boundary of one land portion in the circumferential direction of the drive shaft, and joined continuously to a boundary of another land portion, wherein each of the land portions has a circumferential groove which is longer in the circumferential direction than in a radial direction of the drive shaft, and wherein the flange portion has a slit extending along the circumferential direction of the drive shaft, on an opposite side from a surface facing the pad portion.

7. The thrust bearing device according to claim 6,
wherein the slit is disposed on an outer side relative to a center of the flange portion in the radial direction of the drive shaft.

8. A turbocharger comprising the thrust bearing device according to claim 6.

* * * * *